United States Patent
Baader et al.

[11] Patent Number: 6,069,426
[45] Date of Patent: *May 30, 2000

[54] GODET FOR GUIDING AND ADVANCING A YARN

[75] Inventors: Uwe Baader; Frank Springmeier, both of Wuppertal, Germany

[73] Assignee: Barmag AG, Remscheid, Germany

[*] Notice: This patent is subject to a terminal disclaimer.

[21] Appl. No.: 09/376,749

[22] Filed: Aug. 17, 1999

Related U.S. Application Data

[62] Division of application No. 08/885,243, Jun. 30, 1997, Pat. No. 5,954,258.

[30] Foreign Application Priority Data

Jul. 1, 1996 [DE] Germany .......................... 196 26 335

[51] Int. Cl.[7] ............................ H02K 7/00; H02K 11/00; H02K 1/32; B65H 20/00
[52] U.S. Cl. ........................ 310/67 R; 310/64; 310/68 R; 226/188; 242/366.4; 361/695; 361/715
[58] Field of Search ................................ 310/37 R, 68 R, 310/64, 89; 226/188; 361/695, 715; 242/366.4

[56] References Cited

U.S. PATENT DOCUMENTS

| | | | |
|---|---|---|---|
| 3,809,935 | 5/1974 | Kristen et al. ............................ | 310/68 |
| 4,668,898 | 5/1987 | Harms et al. ........................... | 318/254 |
| 4,840,222 | 6/1989 | Lakin et al. ............................ | 165/47 |
| 4,963,778 | 10/1990 | Jensen et al. ........................... | 310/680 |
| 5,006,744 | 4/1991 | Archer et al. ........................... | 310/89 |
| 5,324,905 | 6/1994 | Arnosti et al. .......................... | 219/619 |
| 5,608,610 | 3/1997 | Brzenzinski ............................ | 361/704 |
| 5,689,403 | 11/1997 | Robertson, Jr. et al. ............... | 361/695 |
| 5,714,816 | 2/1998 | Jensen et al. ............................ | 310/89 |
| 5,745,344 | 4/1998 | Baska et al. ............................ | 361/705 |
| 5,954,258 | 9/1999 | Baader et al. .......................... | 226/188 |

FOREIGN PATENT DOCUMENTS

| | | |
|---|---|---|
| 37 01 077 | 8/1987 | Germany . |
| 93 05 174 U | 11/1993 | Germany . |
| WO 95/06971 | 3/1995 | WIPO . |

OTHER PUBLICATIONS

Patent Abstracts Of Japan, vol. 009, No. 318 (E–366), Dec. 13, 1985 and JP 60 152247 A (Toshiba KK), Aug. 10, 1985.
*Textil praxis International*, Jan. 1992, pp. 37–38.

*Primary Examiner*—Nestor Ramirez
*Assistant Examiner*—Dane Dinh Le
*Attorney, Agent, or Firm*—Alston & Bird LLP

[57] ABSTRACT

A godet for guiding and advancing a yarn with a rotating godet jacket. The godet jacket is mounted to a rotor shaft, which is driven by means of a three-phase motor. The three-phase motor is controlled via a frequency inverter, which is mounted in a housing, whose interior accommodates the electronic subassemblies of the frequency inverter in a stationary and heat transferring manner. The housing of the frequency inverter is firmly connected to the housing of the three-phase motor.

12 Claims, 5 Drawing Sheets

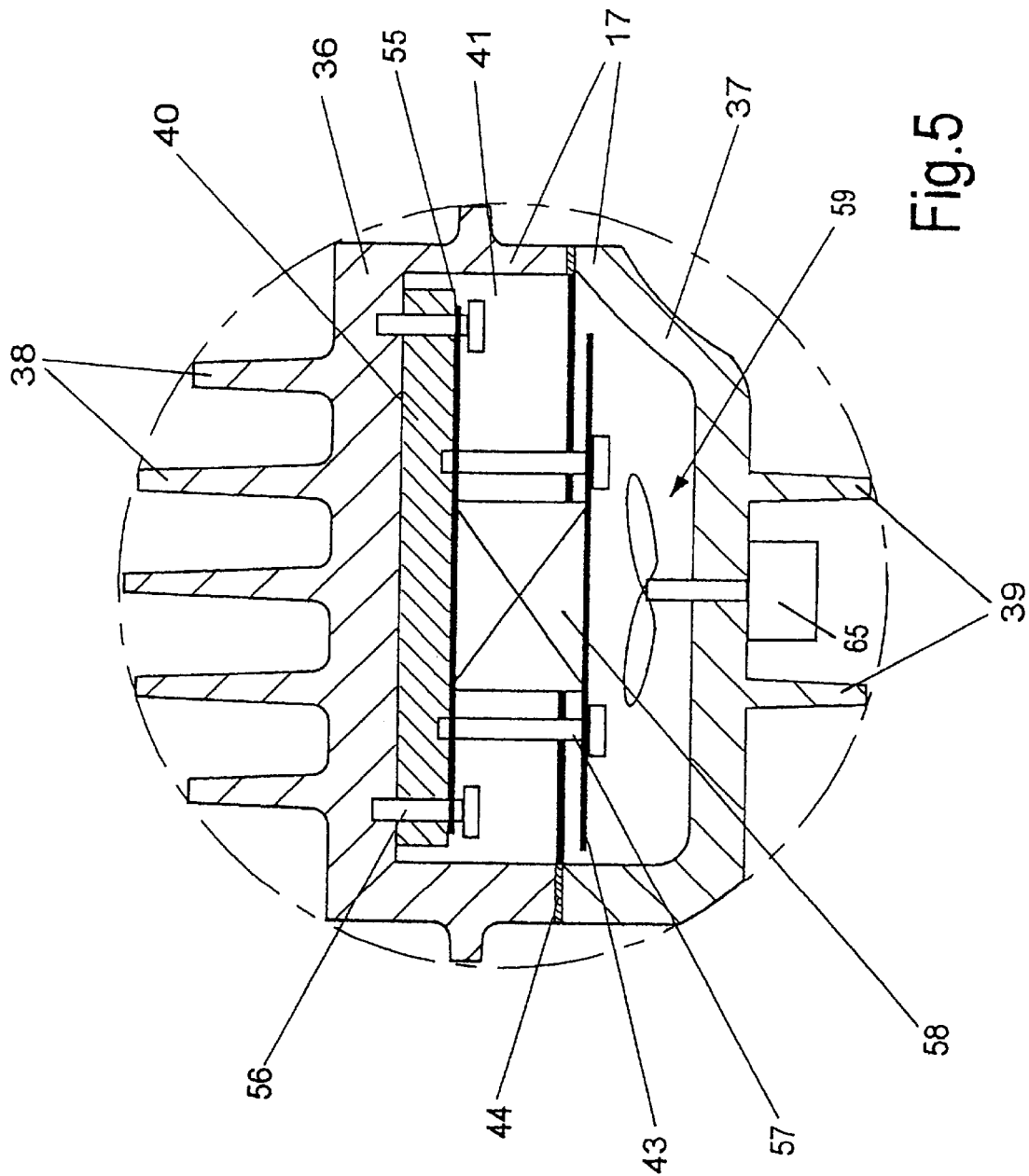

GODET FOR GUIDING AND ADVANCING A YARN

This application is a divisional of application Ser. No. 08/885,243, filed Jun. 30, 1997, now U.S. Pat. No. 5,954,258.

BACKGROUND OF THE INVENTION

The present invention relates to a godet for guiding and advancing a yarn, and particularly for guiding and advancing synthetic filament yarns.

DE 37 01 077 A1 discloses a godet of the described type wherein the godet jacket is connected to a rotor of an electric motor and driven by same. For regulating the rotational speed of the godet, the electric motor is controlled by a frequency inverter. In this connection, it must be ensured that the preselected operating speeds remain constant on the godet and that they are reproducible.

As can be noted from "Textilpraxis International", 1992, pages 37–38, the frequency inverter is accommodated in a control cabinet separated from the godet and connected via cables to the electric motor of the godet. The consequence thereof are long, inverter-fed motor lines, which require increased protection. Furthermore, it is necessary to guide the rotational speed signals of the godet unit over long distances through the machine, which brings along an increased susceptibility to breakdown.

It is therefore the object of the invention to further develop the known godet such as to minimize cabling requirements and susceptibility to breakdown. A further object of the invention is to realize a frequency inverter that is adapted to the surroundings of the godet.

SUMMARY OF THE INVENTION

The above and other objects and advantages of the present invention are achieved by the provision of a godet which comprises a support member, a rotor shaft rotatably mounted to the support member, and a godet jacket mounted coaxially about the rotor shaft. A three phase motor is operatively connected to the rotor shaft, and a frequency inverter is operatively connected to the motor.

The frequency inverter with its electronic subassemblies is encased in a stationary and heat transferring manner in a housing, whose surface is constructed for dissipating heat. The housing is firmly connected with a housing accommodating the three-phase motor. This construction allows a very compact arrangement of the components to be realized, which has the special advantage that the supply of alternating current to the motor occurs directly in the godet. Consequently, long supply lines of AC voltage are no longer needed, thus eliminating the susceptibility to breakdown of the supply. The direct addition of the frequency inverter to the three-phase motor also has the advantage that the rotational speed signals from the drive to the frequency inverter are transmitted directly in the godet over a very short distance. This makes it possible to maintain the operating speeds of the godet very accurately, which is of advantage in particular in the case of draw zones comprising a plurality of godets.

Advantageously, the housing of the frequency inverter is designed and constructed such that vibrations as occur in a godet do not lead to breakdowns in the electronic layout. Furthermore, internal losses within the frequency inverter that are converted to heat, are advantageously dissipated via the housing. In a higher driving power range from about 500 W to 12 kW, losses from 20 W to 500 W are already incurred, which would lead without heat dissipation very rapidly to a high temperature for the electronic components.

The present godet furthermore has the advantage that the electronic devices are engineered more purposefully and thus cost-favorably with respect to the kind of drive, and that they can be manufactured at little cost.

An advantageous further development of the invention provides that the three-phase motor and the housing of the frequency inverter are arranged in axial relationship to one another, which is more favorable, in particular with respect to compactness and heat transfer.

A further advantageous embodiment of the godet provides that the housing of the frequency inverter is furnished with cooling ribs. This is advantageous, in particular in a godet unit operating in a higher power range.

A specially advantageous further development of the invention provides that the housing of the frequency inverter consists of a bottom part and a top part which are furnished with different cooling ribs, and which are insulated from one another against heat. This permits corresponding outward dissipation of losses that variously arise in the subassemblies of the frequency inverter, without heating additionally electronic components sensitive to lesser losses. Thus, in a frequency inverter substantial losses of power occur in the power component, which are by a factor of 50 higher than the loss of power incurred in the control electronic devices contained in the frequency inverter. As a result of the heat insulation between the bottom and the top part, the operating temperature in the interior of the housing is maintained advantageously at an acceptable level. The coupling of the power semiconductors with the top part having a large cooling surface and the coupling of the control electronic devices with the bottom part having a small cooling surface is especially advantageous for a controlled heat transfer and heat dissipation.

In a preferred variant of the godet in accordance with the invention, a fan is arranged in the housing of the frequency inverter. By this arrangement that the heat transfer of the loss energy of the power component and the loss energy of the control electronic devices to the housing walls are improved. Furthermore, this permits the operating temperature to be maintained at a level that is acceptable for the control electronic devices, even in a higher power range of as much as 12 kW.

To extract the dissipation heat from within the housing of the frequency inverter, it will be also advantageous, when the installation space of the housing occupies, compared to the cross section of the housing, a relative proportion which amounts to less than about 40%, and preferably to about one third of the cross sectional area. This allows to attain an optimum of heat dissipating surface of the housing.

Another advantageous further development of the godet unit includes a cup-shaped godet housing which is slipped over the frequency inverter and the three-phase motor, and which is mounted with its open end to the godet flange or the three-phase motor. This arrangement allows a very compact structural unit to be realized, which provides the three-phase motor and the frequency inverter with an additional protective casing to keep away vapors and lint. In particular, it is accomplished that the housing surface of the frequency inverter with its cooling ribs is not subjected to any contaminations and that, thus, a heat exchange with ambient air can occur freely.

Another advantageous further development of the godet unit accommodates a fan wheel with a drive unit in the godet housing, which is cup-shaped and slipped over the frequency inverter and the three-phase motor. This fan wheel permits generation of a cooling air current, which flows along the cooling ribs of the frequency inverter housing and amplifies the dissipation of heat. To this end, the closed end of the godet housing is provided with openings so as to facilitate an exchange of air. This is advantageous in particular in the case of godet units being operated in a higher power range, or in the case of godet units having a heated jacket. To generate a circulating cooling current, the mount of the godet housing to the godet flange or the housing of the three-phase motor is made air permeable. This permits in addition an improved cooling of the three-phase motor.

To generate a purposeful cooling current along the cooling ribs of the inverter housing, it will be especially advantageous, when the fan is supported on a cover, which is arranged in an axial direction directly on the inverter housing.

However, it is also possible to support the fan on the godet housing. This version has the advantage that vibrations generated by the fan are unable to propagate directly to the housing of the frequency inverter.

In godet units, which are operated at very high speeds, it is necessary that the bearings of the rotor shaft are provided with lubricating oil. To this end, an oil pump is used, which is arranged likewise in the godet housing, preferably in an axial direction behind the fan. This arrangement permits to realize very short supply paths that are to be covered between the oil pump and the godet bearing.

As a result of the invention, a godet is created, which can be used universally at any desired location in a spinning line or a textile machine. The operation of the godet requires only a supply of AC voltage as well as a data transmission to a central machine control unit. The regulation of the rotational speed occurs automatically in the godet.

BRIEF DESCRIPTION OF THE DRAWINGS

Some of the objects and advantageous of the present invention having been stated, others will appear as the description proceeds, when considered in conjunction with the accompanying drawings, in which:

FIG. 5 is a schematic, cross sectional view of a frequency inverter with a housing and a fan.

DETAILED DESCRIPTION OF THE PREFERRED EMBODIMENTS

Figure 1:
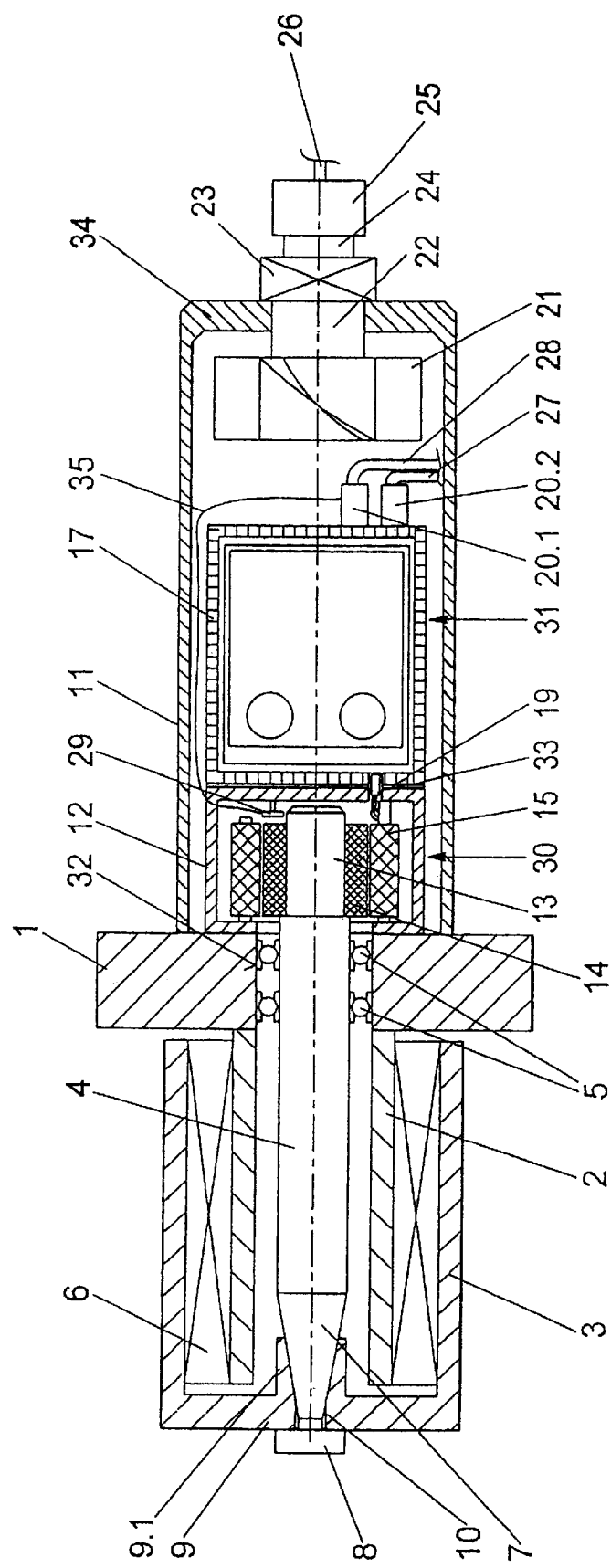
FIG. 1 shows a godet of the present invention with an integrated drive and a frequency inverter.

Referring more particularly to the drawings, a godet which embodies the present invention is illustrated in FIG. 1, which includes a support member in the form of a flange 1 which has a bore 32 for receiving bearings 5 that support a rotor shaft 4. Mounted to godet flange 1 is a projecting, tubular shaft 2 coaxial with bore 32, the rotor shaft 4 extending concentrically with an air gap through the projecting, tubular shaft 2. The rotor shaft 4 projects with its free end beyond the free end of tubular shaft 2. This end of rotor shaft 4 mounts a godet jacket 3. The godet jacket 3 is cup-shaped with a front wall 9 thereof having a bore 10 and an extension 9.1. The free end of rotor shaft 4 is provided with a taper 7. Over this taper, extension 9.1 of godet jacket 3 is slipped and firmly connected to the rotor shaft by means of a clamping element 8. The godet jacket 3 is slipped over projecting, tubular shaft 2, so that an installation space 6 is formed between godet jacket 3 and shaft 2. Depending on the application of the godet, the installation space 6 may accommodate a heating element for heating the godet jacket. Depending on the heating element, the godet jacket could be heated by radiation, convection, or induction.

On the side opposite to the godet jacket, a three-phase motor 30 is mounted to godet flange 1. The three-phase motor 30 has a housing 12 which accommodates a stator with a winding 15. In concentric relationship with stator 15, a rotor winding 14 is mounted on a recessed rotor section 13 at the other end of rotor shaft 4. Energy is supplied to the three-phase motor 30 via a plug connection 19 which connects a frequency inverter 31 to the three-phase motor 30. The frequency inverter 31 with its housing 17 is coupled directly to the housing 12 of the three-phase motor, and so that the motor housing 12 and the inverter housing 17 are aligned along an axial direction defined by the axis of the rotor shaft 4. Between housing 12 and housing 17 of frequency inverter 31 an insulating plate 33 may be arranged for damping vibrations. Accommodated in housing 17 of the frequency inverter are electronic subassemblies, such as a power component and electronic control devices. The frequency inverter 31 is connected by means of plug connections 20.1 and 20.2 to a supply line 27 and a control line 28 of a central unit of a machine control or a control cabinet.

The housings 12 and 17 are enclosed in a cup-shaped godet housing 11, which is slipped over the two housings 12 and 17 and mounted to the godet flange 1. This embodiment of the godet is suitable to operate godets at a low wattage. The stationary heat exchange between the housing surface of frequency inverter 31 and the ambient air suffices to maintain an acceptable temperature level.

In godets operating in a higher power range—as shown in FIG. 1—a fan wheel 21 is mounted in the godet housing 11 so as to be aligned in the axial direction with the motor housing 12 and the inverter housing 17. The fan wheel 21 is mounted on a fan shaft 22, which is supported in the closed end wall 34 of the godet housing 11, and it is driven by a fan motor 23 which is positioned on the outside of the wall 34. The fan motor 23 is connected via plug connections 24 and 25 to a supply line 26. Thus, the cooling of the drive of the godet unit is separate from the supply of the drive.

In operation, the frequency inverter 31 is supplied with direct current. The three-phase current changed by frequency inverter 31 activates three-phase motor 30, so that the rotor shaft 4 is driven at a predetermined speed. The rotational speed of rotor shaft 4 is detected by means of a speed sensor 29 and supplied, via a signalling line 35 to the electronic control devices of the frequency inverter. In this compact arrangement, the interface between the three-phase motor and the frequency inverter is inaccessible. Consequently, for purposes of monitoring, the electronic control devices of the frequency inverter have been programmed in an advantageous manner, so that process-relevant parameters, such as rotational speed and current, can be inquired via a serial port and be supplied to a central unit.

Figure 2:
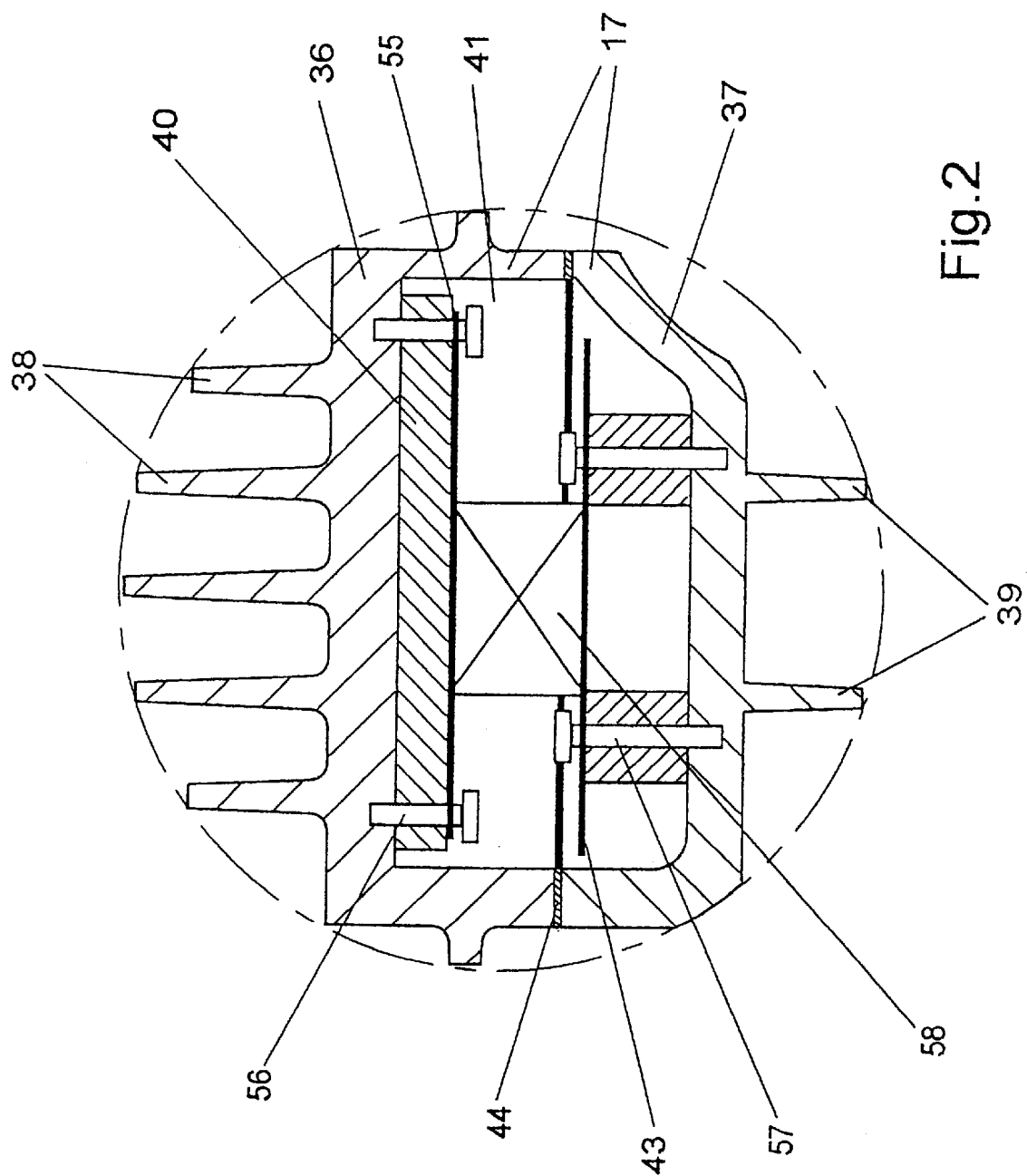
FIG. 2 is a cross sectional view of a frequency inverter with housing.

FIG. 2 is a cross sectional view of the frequency inverter of FIG. 1. In this Figure, the godet housing 11 is omitted. The housing 17 consists of a top part 36 and a bottom part 37. The top part 36 and the bottom part 37 are interconnected via a heat insulation 44 and form in the interior an installation chamber 41. Formed on the outer surface of top part 36 are cooling ribs 38. Formed on the outer surface of the bottom part are cooling ribs 39. Arranged in installation chamber 41 are the electronic subassemblies. In this arrangement, a printed circuit card 55 of the power component with a transistor 40 is secured in vibrationproof manner by means of mounting elements 56 directly to the top part 36, whereas a printed circuit card 43 of the control electronic devices is connected to bottom part 37 by means of mounting elements 57. The printed circuit card 55 and the printed circuit card 43 are interconnected via a plug connection 58. To improve the heat transfer between printed circuit card 43 and bottom part 37, the space therebetween may advantageously be filled at least in places with a highly heat conductive material, which acts as an electrical insulator. Since the power semiconductors release a significant portion of the dissipation power of the frequency inverter, a temperature gradient develops in the installation chamber 41. Thus, a temperature of about 130° C. adjusts itself on the inner side of top part 36 and a temperature of about 70° C. on the inner side of bottom part 37. To avoid that the temperature on the bottom part is increased in addition by power semiconductors 40, a heat insulation 44 is arranged between top part 36 and bottom part 37. Furthermore, the cooling surface formed by cooling ribs 38 is substantially larger than the cooling surface formed by cooling ribs 39. This arrangement has the advantage that the dissipation heat can be extracted directly at its place of origination. Furthermore, it is avoided that the acceptable temperature of electronic components having a limited temperature stability is not exceeded, which applies in particular to the electronic control devices.

Figure 3:
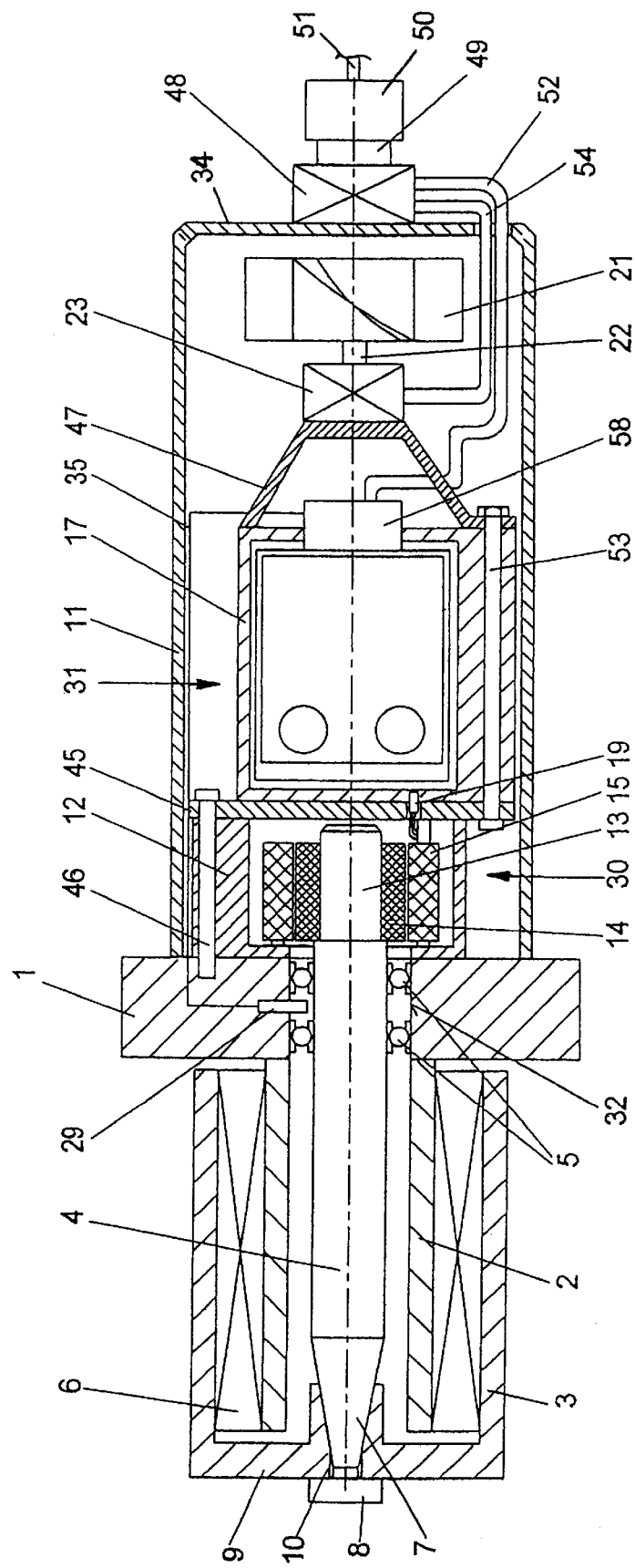
FIG. 3 is a cross sectional view of a further embodiment of a godet with an integrated drive and frequency inverter.
Figure 4:
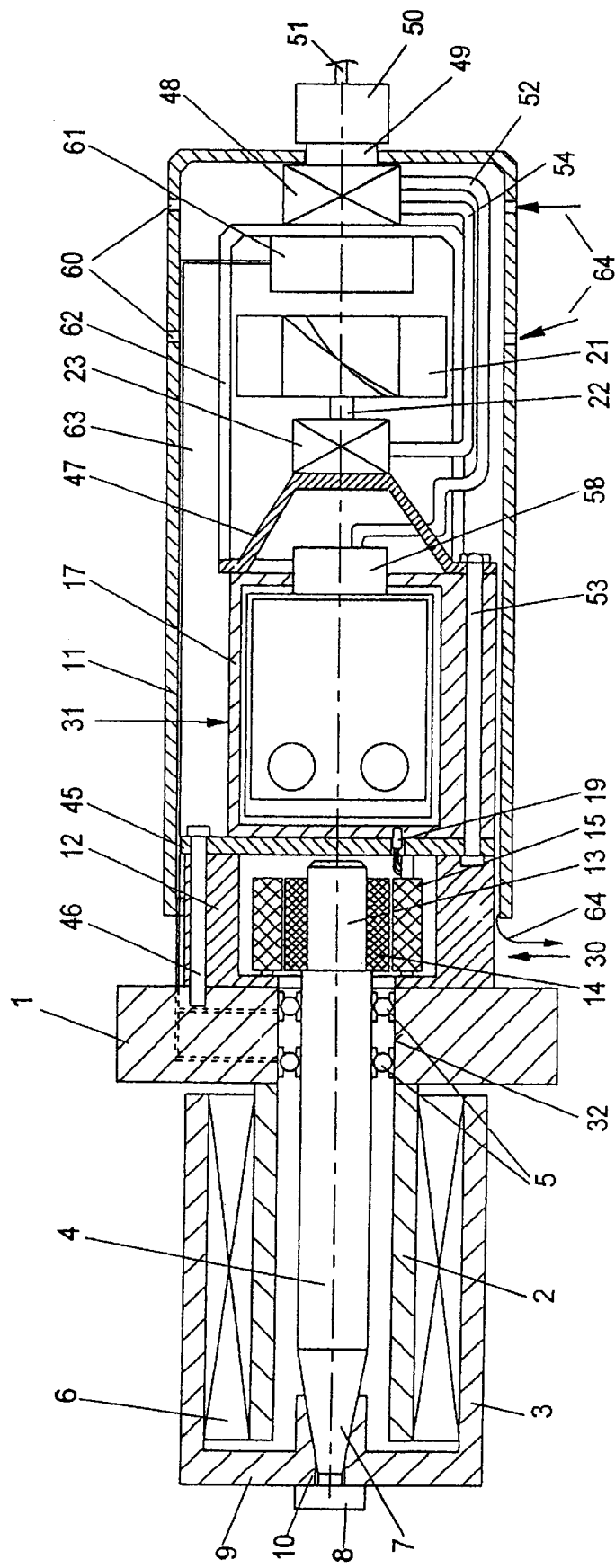
FIG. 4 is a cross sectional view of still another embodiment of a godet with an integrated drive and frequency inverter.

FIGS. 3 and 4 illustrate further embodiments of a godet. The mechanical layout of the godet is identical with the godet unit of FIG. 1, so that the description of FIG. 1 is herewith incorporated by reference. Therefore, like parts are provided with like numerals. In the embodiment of FIG. 3, the housing 12 of three-phase motor 30 and an adapter plate 45 are mounted to the godet flange 1 by means of anchor bolts 46. Furthermore, the frequency inverter housing 17 and a cover 47 which is mounted to the side of the inverter facing away from the three-phase motor, are connected to adapter plate 45 by means of an anchor bolt 53. The cover 47 mounts the fan motor 23 with fan shaft 22 and fan wheel 21. Provided on the closed end wall 34 of godet housing 11 is a terminal box 48. The supply of power to the godet unit is ensured via plug connection 49 and plug 50 with a line 51. The supply of power and activation of the inverter proceed from terminal box 48 via line 52 to plug connection 58. The fan motor 23 is energized from terminal box 48 via line 54.

This arrangement has the advantage that the adapter plate 45 permits suppression of vibrations between the godet flange and the frequency inverter. In the arrangement shown in FIG. 3, the adapter plate 45 can also be used with advantage as a cover for the inverter housing. In this connection, it is to be noted that the interelement protection IP 54 or IP 64 be maintained, which is realized by inserting seals between the adapter plate and the inverter housing. In addition, the godet unit brings about the advantage that it can be installed from the operating side of the machine through a round opening in the machine frame.

Likewise, as has been described with reference to FIG. 3, in the embodiment of FIG. 4 the housing 17 of the frequency inverter is mounted to adapter plate 45 by means of anchor bolt 53. Simultaneously, anchor bolts 53 secure cover 47 which is arranged in the axial direction on the opposite front side of housing 17 accommodating frequency inverter 31. The cover 47 is provided with a frame 62. The cover 47 and frame 62 serve to accommodate the fan wheel 21 as well as an oil pump 61 and terminal box 48 with plug 49. Via an oil line 63, the oil pump 61 connects to bearings 5 of rotor shaft 4. In this arrangement, the godet housing 11 is mounted with its free end to housing 12 of the three-phase motor, and it encloses all of the components. At its closed end, the godet housing 11 has an opening for plug connection 49 and plug 50. In the wall of godet housing 11, at the closed end thereof, openings 60 are arranged. These openings facilitate a cooling air current, which is generated by means of fan wheel 21 in the interior of the godet housing. In this instance, the godet housing 11 can be mounted to the three-phase motor housing 12 such as to permit an exchange of air. Thus, a permanent cooling air current 64 flows through the axially aligned cooling ribs of housing 17 accommodating the frequency inverter. Likewise, an air current is directed to the three-phase motor 30, thereby cooling same. This configuration of a cooling system permits the godet of the present invention to be realized for a maximum power range of as much as 12 kW.

In this case, it may be advantageous to effect within the housing 17 of frequency inverter 31 a forced air cooling of the electronic components. To this end, an embodiment is shown in FIG. 5. The housing as well as the components are identical with those in the embodiment of FIG. 2, so that the description thereof is herewith incorporated by reference. Unlike the version shown in FIG. 2, the printed circuit card 43 is secured by means of mounting elements 57 to the power component. In the space between the printed circuit card 43 and the bottom part 37, a fan 59 is supported in the wall of bottom part 37. The fan 59 generates an air current inside installation chamber 41, and it is operated by means of a fan drive 65. This measure of a forced air cooling in installation chamber 41 allows to accomplish that the dissipation of heat to the wall of housing 17 is improved. The forced air cooling of the electronic components within housing 17 can advantageously be assisted by a special configuration of the bottom part and top part.

The godet unit of the present invention can be used in the spinning process or in a textile machine at any location provided for this purpose. The special configuration of the frequency inverter facilitates controlling environmental conditions with respect to temperature, contamination, and vibration. Likewise, the encasement permits compliance with the types of protection against moisture, lint and dust. As a drive, it is preferred to use synchronous, or even asynchronous motors.

That which is claimed is:

1. A godet for guiding and advancing a yarn comprising a support member,
   a rotor shaft rotatably mounted to said support member so as to define an axial direction,
   a godet jacket mounted coaxially about said rotor shaft,
   a three phase motor operatively connected to said rotor shaft, said three phase motor being mounted within a motor housing which is fixed to said support member, and
   a frequency inverter operatively connected to said three phase motor, said frequency inverter including electronic subassemblies which are encased in a stationary and heat transferring manner within an inverter housing, and with said inverter housing having a heat dissipating surface and being fixed to said motor housing, and with said motor housing and said inverter housing being aligned along said axial direction.

2. The godet as defined in claim 1 wherein the support member includes a godet flange having an opening which coaxially receives the rotor shaft, and wherein the godet jacket is mounted on one side of the godet flange and the motor housing and the inverter housing are mounted on the other side of the godet flange.

3. The godet as defined in claim 2 wherein an adapter plate is interposed between the inverter housing and the motor housing, and wherein the adapter plate is fixed to the godet flange.

4. The godet as defined in claim 2 wherein the heat dissipating surface of the inverter housing includes external cooling ribs which extend in the axial direction.

5. The godet as defined in claim 1 wherein the inverter housing comprises opposing top and bottom parts, and wherein the top and bottom parts each include external cooling ribs which extend in the axial direction.

6. The godet as defined in claim 5 wherein the external cooling ribs of the top and bottom parts are differently shaped and/or different in number, and wherein a heat insulating member is interposed between the top and bottom parts.

7. The godet as defined in claim 5 wherein the electronic subassemblies of the frequency inverter include a power component which is mounted in heat transfer relationship to the top part.

8. The godet as defined in claim 7 wherein the electronic subassemblies of the frequency inverter further include an electronic control device which is mounted in heat transfer relationship to the bottom part.

9. The godet as defined in claim 8 wherein the electronic control device is fixedly mounted to the power component.

10. The godet as defined in claim 1 wherein a cooling air fan is mounted within said inverter housing.

11. The godet as defined in claim 1 wherein the inverter housing defines a generally circular enclosure.

12. The godet as defined in claim 11 wherein the enclosure of the inverter housing includes an installation chamber which occupies an area less than about 40% of the cross-sectional area of the enclosure.

* * * * *